Figure 1:
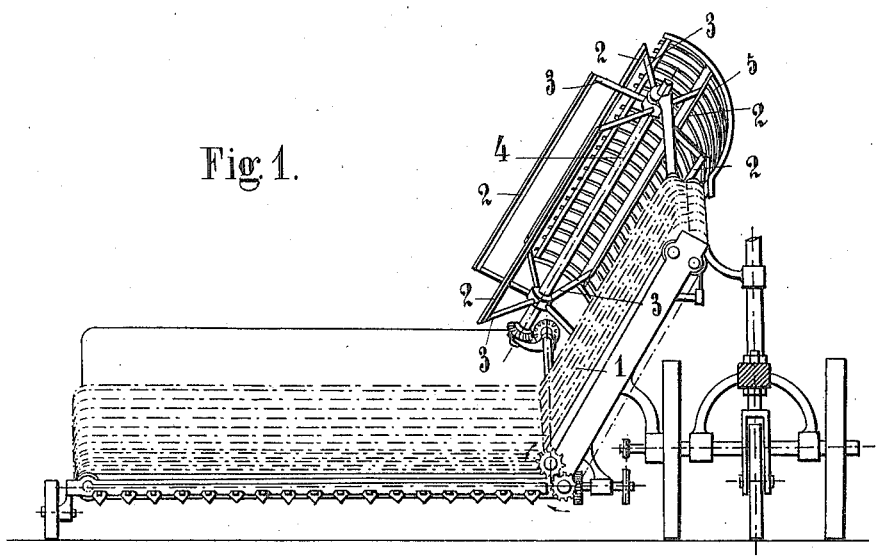

GEORGES-ERHARD-MARIE-GUY-BERNARD DE SALABERRY.
THRESHING MACHINE.
APPLICATION FILED JULY 18, 1911.

1,164,269.

Patented Dec. 14, 1915.

WITNESSES
John Murtagh
L. M. Dorman

INVENTOR
Georges-Erhard-Marie-Guy-Bernard de Salaberry
BY
ATTORNEYS

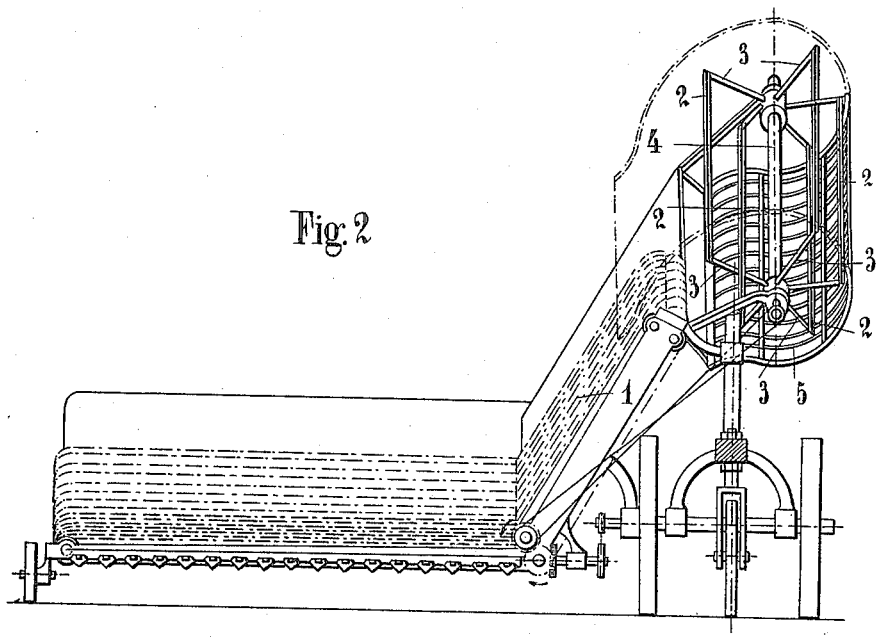

UNITED STATES PATENT OFFICE.

GEORGES-ERHARD-MARIE-GUY-BERNARD DE SALABERRY, OF FOSSÉ, FRANCE.

THRESHING-MACHINE.

1,164,269.    Specification of Letters Patent.    Patented Dec. 14, 1915.

Application filed July 18, 1911.   Serial No. 639,096.

*To all whom it may concern:*

Be it known that I, GEORGES-ERHARD-MARIE-GUY-BERNARD DE SALABERRY, a citizen of the Republic of France, and resident of Fossé, Loir-et-Cher, France, have invented new and useful Improvements in Threshing-Machines, which improvements are fully set forth in the following specification.

In Letters Patent No. 964,966, issued to me under date of July 19, 1910, a threshing machine is described; by means of which, after cutting cereals, the grains thereof and the stalks could be separated immediately. The said improvement consisted chiefly in the use, in place of the reed or comb or combs, of a threshing device, characterized by a perforated frame constituted of a grating, or perforated sheet metal or made of wooden or metal rods, to which a reciprocating motion relatively to another frame formed of wood or metal rods was communicated by means of any suitable mechanical transmission, the whole system being arranged at the back of the tractor system with bands consisting of endless chains, cables or belts, in the central plane of which band the frame with rods could be either fixed or have a reciprocating or hammering or any other motion suitable for assisting the threshing operation.

This invention has for its object to substitute for the threshing work done by means of combs, a rotary beater or threshing cylinder which takes the cereals either transversely to the stalks, or parallel with the stalks, in combination with a concave below the threshing cylinder and a tractor system consisting of inclined feed-aprons and means for moving them toward the threshing cylinder and concave.

Figure 1 is a perspective view of one construction in which the axis of the threshing cylinder is at a right angle to the stalks of the cereals, and Fig. 2 is a perspective view of another construction in which the axis of the threshing cylinder is parallel to the stalks of the cereals.

In the construction shown in Fig. 1, the threshing cylinder is arranged at the back of the tractor system 1 provided with bands consisting of endless chains, cables or belts. This threshing cylinder has the usual construction, that is to say, is constituted by wooden or metal bars 2 supported by arms 3 radiating from a spindle 4. The spindle 4 is connected by a suitable transmission gear to the driving axle, and the circular path in which the bars 2 travel, is partly closed by a sheet metal plate or concave 5 separated from the threshing cylinder only by a very small distance. This plate or concave is, of course, bent in accordance with the path of the bars 2, and is also perforated and provided with metal bars or rods which oppose their resistance to the grain carried by the threshing cylinder and at the same time afford passage for its discharge. In this construction, the threshing cylinder and the concave being arranged at a right angle to the direction in which the bands of the tractor system 1 rise strike therefore only the portion of the stalks of the cereals which has not been seized by the said chains.

The threshing cylinder and the concave can also be arranged, as shown in Fig. 2, parallel to the tractor system or to the conveyer bands of an ordinary binder and located where the stalks emerge entirely from the bands. In such an arrangement, the entire stalks and not a portion thereof are driven by the threshing cylinder between the latter and the concave.

In the first construction (Fig. 1), the length of the threshing cylinder must be calculated in proportion to that of the tractor apparatus. In the second construction (Fig. 2), this length must correspond to the greatest length of the stalks which are treated entirely, as is done in ordinary threshers.

Obviously the direction of rotation of the bars 2 relatively to the bands or chains varies according to the position of the threshing apparatus. When the threshing cylinder is at a right angle (Fig. 1) it drives the grain downward; when the threshing cylinder is parallel (Fig. 2), it raises the stalks.

The separated grain is received in any suitable casing surrounding the concave, below the same, and which is omitted for the sake of clearness in the drawings, as are also omitted numerous other parts going to make up the machine, all of which are well known without detail description.

I claim—

In a threshing-machine of the character described, the combination, with a tractor comprising two inclined feed-belts in close proximity and adapted to securely hold the stalks between them, and means for moving the belts in upward direction, of a rotary threshing cylinder supported at the side of said belts within threshing distance of the stalk heads projecting therefrom, and having its axis parallel with the direction of travel of the feed belts, and a concave in proximity to the threshing-cylinder.

In testimony whereof I have signed this specification in the presence of two subscribing witnesses.

GEORGES-ERHARD-MARIE-GUY-
BERNARD DE SALABERRY.

Witnesses:
H. C. COXE,
EMILE LEDREL.

Copies of this patent may be obtained for five cents each, by addressing the "Commissioner of Patents, Washington, D. C."